US012811032B2

(12) United States Patent
Gustafsson et al.

(10) Patent No.: US 12,811,032 B2
(45) Date of Patent: Nov. 24, 2026

(54) METHOD OF BUILDING AN INSULATION SYSTEM OF A POWER CABLE

(71) Applicant: NKT HV Cables AB, Lyckeby (SE)

(72) Inventors: Kristian Gustafsson, Karlskrona (SE); Jörn Antonischki, Fågelmara (SE); Tommy Johansson, Bräkne-Hoby (SE)

(73) Assignee: NKT HV Cables AB, Lyckeby (SE)

(*) Notice: Subject to any disclaimer, the term of this patent is extended or adjusted under 35 U.S.C. 154(b) by 485 days.

(21) Appl. No.: 18/461,732

(22) Filed: Sep. 6, 2023

(65) Prior Publication Data

US 2024/0079163 A1 Mar. 7, 2024

(30) Foreign Application Priority Data

Sep. 7, 2022 (EP) .................................... 22194342

(51) Int. Cl.
*H01B 13/08* (2006.01)
*H01B 9/02* (2006.01)

(52) U.S. Cl.
CPC ......... *H01B 13/0891* (2013.01); *H01B 9/027* (2013.01)

(58) Field of Classification Search
None
See application file for complete search history.

(56) References Cited

U.S. PATENT DOCUMENTS 4,207,429 A * 6/1980 Ward .................. H02G 15/196 156/49
2010/0078195 A1* 4/2010 Patel ..................... H01B 9/027 29/868

FOREIGN PATENT DOCUMENTS

CN 108233282 A 6/2018
CN 108780676 A 11/2018
(Continued)

OTHER PUBLICATIONS

Machine Translation of Netherlands Patent 8205081, Date Unknown.*
(Continued)

*Primary Examiner* — Christopher T Schatz
(74) *Attorney, Agent, or Firm* — Whitmyer IP Group LLC

(57) ABSTRACT

A method of building an insulation system around an axial section of a conductor of a power cable, the method including: a) providing a power cable including a conductor and an insulation system arranged around the conductor, the insulation system including insulation system layers, including an inner semiconducting layer arranged around the conductor, an insulation layer arranged around the inner semiconducting layer, and an outer semiconducting layer arranged around the insulation layer, wherein the power cable includes an axial section between a first insulation system section and a second insulation system section of the insulation system which at least is without an outer semiconducting layer, b) winding a tape around the conductor along the axial section in a plurality of layers to form a plurality of layers of tape connecting with the first insulation system section and the second insulation system section, and c) heating the plurality of layers of tape to melt and fuse the plurality of layers of tape to form an insulation system layer between the first insulation system section and the second insulation system section, wherein the tape has a width defined by a distance between lateral edges, wherein the tape has a mid-section between its lateral edges, wherein in the mid-section the tape has a largest thickness, and wherein the thickness of the tape decreases from the mid-section towards both lateral edges.

18 Claims, 1 Drawing Sheet

(56) References Cited

FOREIGN PATENT DOCUMENTS

| | | | | | |
|---|---|---|---|---|---|
| FR | 1327542 A | * | 5/1963 | ............... | H01B 3/46 |
| JP | 6-77417 A | * | 10/1994 | | |
| JP | 2003052118 A | | 2/2003 | | |
| NL | 8205081 A | * | 11/1983 | ............... | H01B 7/02 |

OTHER PUBLICATIONS

Machine Translation of Japanese Patent 6-77417, Date Unknown.*
Machine Translation of French Patent 1327542, Date Unknown.*
Extended European Search Report; Application No. 22194342.6: Completed: Jan. 20, 2023; Issued: Feb. 3, 2023; 8 Pages.

* cited by examiner

METHOD OF BUILDING AN INSULATION SYSTEM OF A POWER CABLE

TECHNICAL FIELD

The present disclosure generally relates to power cables.

BACKGROUND

The insulation system of a power cable in a power grid infrastructure comprises an inner semiconducting layer, an insulation layer arranged outside the inner semiconducting layer, and an outer semiconducting layer arranged outside the insulation layer.

Cable lengths of power cables that have extruded insulation systems may be connected with a so-called factory joint. Factory joints are often not easily detectable from the outside, for example because the jointing of the insulation system is done before the outermost sheath or serving is provided around the cable core.

Typically, when performing a factory joint the insulation system of the two cable lengths are pencilled, i.e., made tapering, pointing towards each other after the conductors have been jointed. Tape is then wound around the conductor to form the three aforementioned layers. The tapes are cured by means of a heating process, for example as disclosed in JPS61243680.

A drawback with this process is that edges between the inner or outer semiconducting layer and the insulating layer may be created during the heating process. This locally increases the electric field and may result in discharges within the insulation that may damage the insulation system or lead to a breakdown of the insulation system.

It has been found that the tape that forms the insulation layer softens more slowly than the inner semiconducting layer and the outer semiconducting layer during the heating process. Therefore, the edges of tape that forms the insulation layer, which are normally laid with an overlap, push into the inner semiconducting layer during the heating process, resulting in edges between the insulation layer and the inner semiconducting layer causing locally increased electric field in use of the cable.

SUMMARY

A general object of the present disclosure is to provide a method of building an insulation system of a power cable which solves or at least mitigates problems of the prior art.

There is hence according to a first aspect of the present disclosure provided a method of building an insulation system around an axial section of a conductor of a power cable, the method comprising: a) providing a power cable including a conductor and an insulation system arranged around the conductor, the insulation system comprising insulation system layers, including an inner semiconducting layer arranged around the conductor, an insulation layer arranged around the inner semiconducting layer, and an outer semiconducting layer arranged around the insulation layer, wherein the power cable comprises an axial section between a first insulation system section and a second insulation system section of the insulation system which at least is without an outer semiconducting layer, b) winding a tape around the conductor along the axial section in a plurality of layers to form a plurality of layers of tape connecting with the first insulation system section and the second insulation system section, and c) heating the plurality of layers of tape to melt and fuse the plurality of layers of tape to form an insulation system layer between the first insulation system section and the second insulation system section, wherein the tape has a width defined by a distance between its lateral edges, wherein the tape has a mid-section between the lateral edges, wherein in the mid-section the tape has a largest thickness, and wherein the thickness of the tape decreases from the mid-section towards both lateral edges.

Because of the decreasing thickness of the tape towards the lateral edges, the risk of edge formation during the heating is greatly reduced. The tapering shape at the same time provides a high filling factor.

According to one embodiment the thickness decreases smoothly towards both lateral edges.

According to one embodiment the thickness decreases symmetrically towards the lateral edges. The symmetry is here with respect to a central longitudinal axis of the tape, i.e., along the axial extension of the tape.

According to one embodiment in cross-section of the tape, the tape has a convex shape.

According to one embodiment the convex shape is biconvex or piano-convex.

According to one embodiment in step b) in each layer of the plurality of layers, adjacent turns are arranged with an overlap.

According to one embodiment in each layer of the plurality of layers, each turn of tape is arranged axially shifted along the axial direction of the conductor relative to all turns of the tape of any adjacent layer of tape.

According to one embodiment each turn is shifted axially at least with 20%, such as at least 30%, such as at least 40% of the width of the tape.

According to one embodiment in step c) the tape is heated under pressure higher than atmospheric pressure.

One embodiment comprises prior to step b) providing an inner semiconducting layer around the conductor, wherein in step b) the winding of the tape is around the inner semiconducting layer.

According to one embodiment the insulation system layer is an insulation layer or an outer semiconducting layer.

Each of the three layers of the insulation system, i.e., the inner semiconducting layer, the insulation layer, and the outer semiconducting layer, are preferably subjected to the step of heating individually. Thus, after winding a tape for forming the inner semiconducting layer, this tape is heated and cured before the tape that will form the insulation layer is wound around the inner semiconducting layer. Moreover, the tape that will form the insulation layer is heated and cured before the tape that forms the outer semiconducting layer is wound around the insulation layer. The risk of edge formation is thus usually with respect to the underlying insulation system layer.

According to one embodiment the tape comprises a polymeric material.

According to one embodiment the polymeric material includes one of polyethylene, polypropylene, ethylene propylene rubber, EPR, and ethylene propylene diene monomer rubber.

According to one embodiment the building of the insulation forms part of a cable-jointing operation or a repair operation of the insulation system of the power cable.

According to one embodiment the power cable is a high voltage power cable.

The power cable may be an AC or a DC power cable.

The power cable may be a submarine power cable or an underground power cable.

There is according to a second aspect of the present disclosure provided a power cable obtainable by the method of the first aspect.

Generally, all terms used in the claims are to be interpreted according to their ordinary meaning in the technical field, unless explicitly defined otherwise herein. All references to "a/an/the element, apparatus, component, means, etc.," are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
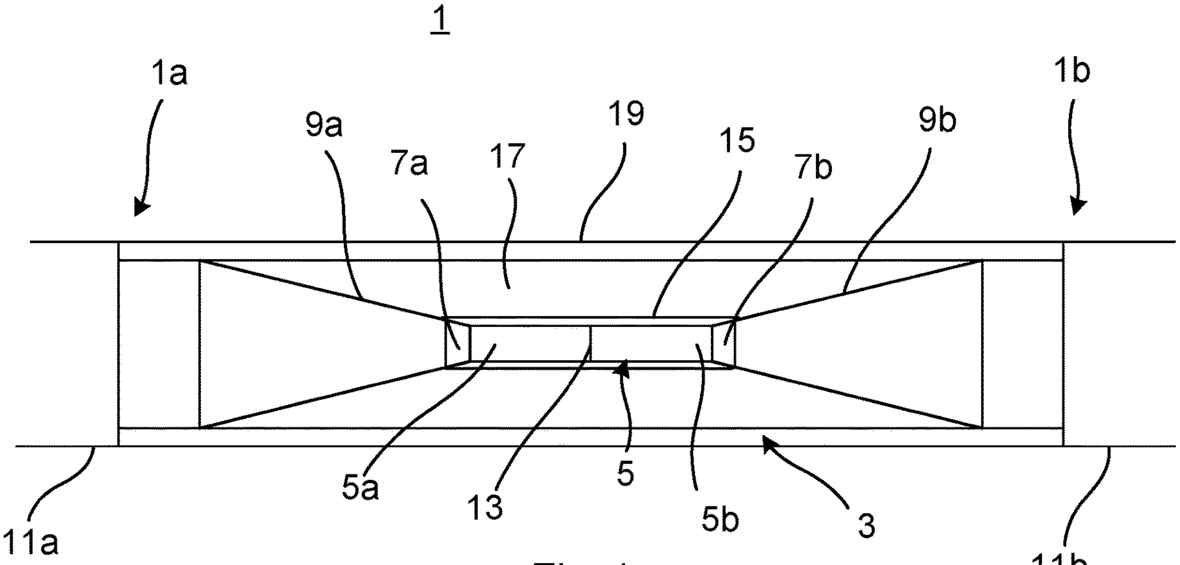
FIG. 1 schematically shows a longitudinal section of a power cable with a joint.

FIG. 1 schematically shows an example of a longitudinal section of a power cable 1 provided with a factory joint 3.

The power cable 1 comprises a first section 1*a* and a second section 1*b* joined by means of the factory joint 3.

The first section 1*a* includes a first conductor section 5*a*, an inner semiconducting layer 7*a*, also called conductor screen, arranged around the first conductor section 5*a*, an insulation layer 9*a* arranged around the inner semiconducting layer 7*a*, and an outer semiconducting layer 11*a*, also called insulation screen. The inner semiconducting layer 7*a*, the insulation layer 9*a*, and the outer semiconducting layer 11*a* arranged around the first conductor section 5*a* form a first insulation system section of the power cable 1.

The first insulation system section is an extruded insulation system. Each of the inner semiconducting layer 7*a*, the insulation layer 9*a*, and the outer semiconducting layer 11*a* may comprise a polymeric material, such as polyethylene, polypropylene, ethylene propylene rubber, EPR, or ethylene propylene diene monomer rubber (EPDM).

Similarly, the second section 1*b* comprises a second conductor section 5*b*, an inner semiconducting layer 7*b* arranged around the second conductor section 5*b*, an insulation layer 9*b* arranged around the inner semiconducting layer 7*b*, and an outer semiconducting layer 11*b*. The inner semiconducting layer 7*b*, the insulation layer 9*b*, and the outer semiconducting layer 11*b* arranged around the second conductor section 5*b* form a second insulation system section of the power cable 1.

The second insulation system section of the second section 1*b* is an extruded insulation system. Each of the inner semiconducting layer 7*b*, the insulation layer 9*b*, and the outer semiconducting layer 11*b* may comprise a polymeric material, such as polyethylene, polypropylene, ethylene propylene rubber, EPR, or ethylene propylene diene monomer rubber (EPDM).

The first and second conductor sections 5*a* and 5*b* are according to the example joined. The conductor sections 5*a* and 5*b* are thus connected via a conductor joint 13 and form a single conductor 5. The conductor sections 5*a* and 5*b* may for example be joined thermally such as by welding.

The first insulation system section and the second insulation system section are joined and form an insulation system of the power cable 1.

The first insulation systems section and the second insulation system section are joined using tapes to form an inner semiconducting layer 15 which connects the inner semiconducting layer 7*a* and 7*b* of the first insulation system section and the second insulation system section, respectively, to form an insulation layer 17 which connects the insulation layer 9*a* and 9*b* of the first insulation system section and the second insulation system section, respectively, and to form an outer semiconducting layer 19 which connects the outer semiconducting layer 11*a* and 11*b* of the first insulation system section and the second insulation system section, respectively.

A method of building an insulation system around exposed first and second conductor sections 5*a* and 5*b* to form a power cable such as power cable 1 will now be described with reference to FIGS. 2 to 3*c*.

The building of the insulation system may form part of a cable-jointing operation of the power cable 1 or a repair operation of the insulation system of the power cable 1.

In case the method concerns a cable-jointing operation, the first section 1*a* and the second section 1*b* are initially not joined. In this case, the first conductor section 5*a* and the second conductor section 5*b* are initially not connected. Prior to joining the first conductor section 5*a* and the second conductor section 5*b*, an end portion of the first conductor section 5*a* and the second conductor section 5*b* is exposed. Further, the respective inner semiconducting layer 7*a*, 7*b*, insulation layer 9*a*, 9*b*, and outer semiconducting layer 11*a*, 11 *b* are exposed sequentially for each of the first section 1*a* and the second section 1*b*. Moreover, each insulation layer 9*a*, 9*b* may be pencilled, i.e., formed as a cone, arranged tapering towards each other, as shown in FIG. 1.

The first conductor section 5*a* and the second conductor section 5*b* are joined to form the conductor joint 13.

Alternatively, if the method concerns a repair operation of the insulation system, the conductor 5 may not require jointing in the region where the insulation system is to be built around the conductor 5. Also in this case, the first conductor section 5*a* and the second conductor section 5*b* are exposed to enable rebuilding of the insulation system in the damaged region. Further, the respective insulation layer 9*a*, 9*b*, and outer semiconducting layer 11*a*, 11 *b* are exposed sequentially for each of the first section 1*a* and the second section 1*b*. Also in this case, the insulation layer 9*a*, 9*b* may be pencilled, i.e., formed as a cone, arranged tapering towards each other.

In both cases, at this point the first insulation system section and the second insulation system section are axially distanced from each other. In particular, the power cable 1 has an axial section between the first insulation system section and the second insulation system section which is at least without an outer semiconducting layer.

In a step a) of the method, the power cable 1 having an axial section between the first insulation system section and the second insulation system section, which is at least without the outer semiconducting layer, is provided.

Typically, the inner semiconducting layer 15 is provided around the exposed and joined conductor sections 5*a*, 5*b* prior to step a). The inner semiconducting layer 15 may alternatively be provided around the exposed, and in the region non-jointed, conductor 5 in examples that concern repair of the insulation system of the power cable 1.

The inner semiconducting layer 15 may for example be made by winding tape around the exposed first and second conductor sections 5*a*, 5*b*, and heating the tape to cure the tape.

In a step b) tape is wound around the conductor 5 along an axial section between the first insulation system section and the second insulation system section.

The tape is wound in a plurality of layers to form a plurality of layers of tape connecting with the first insulation system section and the second insulation system section of the power cable 1.

According to one example in step b) in each layer of the plurality of layers, adjacent turns are arranged with an overlap.

According to one example in each layer of the plurality of layers, each turn of tape is arranged axially shifted along the axial direction of the conductor 5 relative to all turns of the tape of any adjacent layer of tape. Each turn may for example be shifted axially at least with 20%, such as at least 30%, such as at least 40% of the width of the tape.

In a step c) the plurality of layers of tape are heated to melt and fuse the plurality of layers of tape to form an insulation system layer between the first insulation system section and the second insulation system section. Further, the thus obtained insulation system layer is also fused with the first insulation system section and the second insulation system section. In particular, the insulation system layer is fused with the corresponding insulation system layer of the first insulation system section and the second insulation system section.

The insulation system layer formed in step c) may be the insulation layer 17 or the outer semiconducting layer 19, connecting the first insulation system section and the second insulation system section.

In step c) the tape may be heated under pressure higher than atmospheric pressure. For example, the pressure may be at least 2 bar, such as at least 3 bar, or at least 4 bar.

Figure 2:
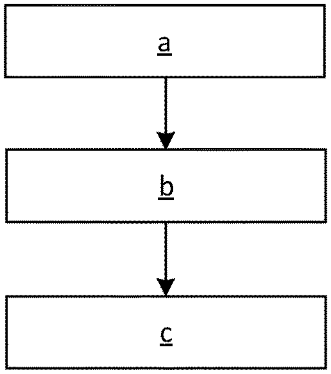
FIG. 2 is a flowchart of a method of building an insulation system around an axial section of a conductor of a power cable.

FIG. 2 shows an example of the tape 21-1 used in step b). The tape 21-1 has a width w defined by the distance between its lateral edges 21*a*, 21*b*. The tape 21-1 has a mid-section 21*c* between the lateral edges 21*a*, 21*b*. In the mid-section 21*c*, the tape 21-1 has its largest thickness t. The thickness of the tape 21-1 decreases from the mid-section 21*c* in a direction towards the lateral edge 21*a* and in a direction towards the lateral edge 21*b*. The thickness of the tape 21 at the lateral edges 21*a*, 21*b* is thus smaller than the largest thickness tin the mid-section 21*c*.

The thickness of the tape 21 may preferably decrease smoothly towards both lateral edges 21*a*, 21*b*.

The thickness of the tape 21 may taper symmetrically towards the lateral edges 21*a*, 21*b*. With respect to a centre axis A through the mid-section 21*c*, the tapering is symmetric on both sides of the centre axis A.

Figure 3A:
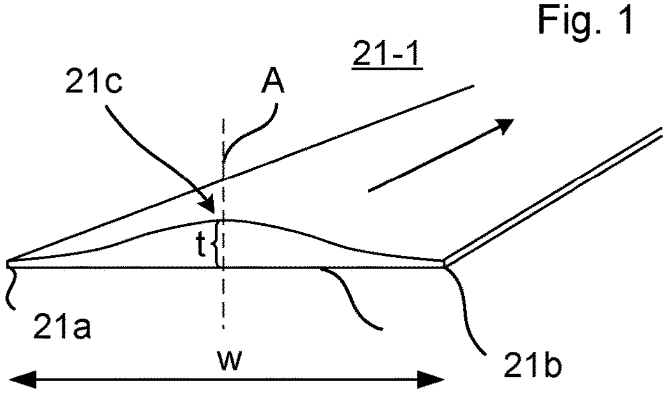
FIG. 3*a* schematically shows an example of a tape.
Figure 3B:
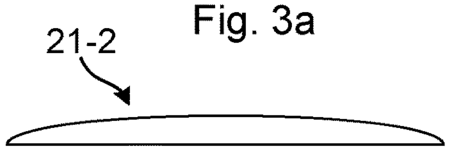
FIGS. 3*b*-3*c* show cross-sections of examples of tapes.
Figure 3C:
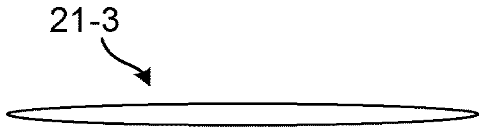

The tape may in cross-section have a convex shape, as shown FIGS. 3*b* and 3*c*. According to the example in FIG. 3*b*, the tape 21-2 is plano-convex. In the example depicted in FIG. 3*c*, the tape 21-3 is biconvex.

The tape 21-1, 21-2, 21-3 comprises a polymeric material. The polymeric material may for example include one of polyethylene, polypropylene, ethylene propylene rubber, and ethylene propylene diene monomer rubber.

Tape with a geometric structure as shown in FIGS. 3*a*-3*c* may be used for the insulation layer or the outer semiconducting layer, or for both these layers. The material of the tape 21-1, 21-2, 21-3 would however differ for the two layers. It is made of an insulating material for the insulation layer and of a semiconducting material for the outer semiconducting layer.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of building an insulation system around an axial section of a conductor of a power cable, the method comprising:

a) providing a power cable including a conductor and an insulation system arranged around the conductor, the insulation system comprising insulation system layers, including an inner semiconducting layer arranged around the conductor, an insulation layer arranged around the inner semiconducting layer, and an outer semiconducting layer arranged around the insulation layer, wherein the power cable includes an axial section between a first insulation system section and a second insulation system section of the insulation system which at least is without an outer semiconducting layer, b) winding a tape around the conductor along the axial section in a plurality of layers to form a plurality of layers of tape connecting with the first insulation system section and the second insulation system section, and c) heating the plurality of layers of tape to melt and fuse the plurality of layers of tape to form an insulation system layer between the first insulation system section and the second insulation system section, wherein the tape has a width defined by a distance between lateral edges, wherein the tape has a mid-section between its lateral edges, wherein in the mid-section the tape has a largest thickness, and wherein the thickness of the tape decreases from the mid-section towards both lateral edges, wherein in each layer of the plurality of layers, each turn of tape is arranged axially shifted along an axial direction of the conductor relative to all turns of the tape of any adjacent layer of tape.

2. The method as claimed in claim 1, wherein the thickness decreases smoothly towards both lateral edges.

3. The method as claimed in claim 1, wherein the thickness decreases symmetrically towards the lateral edges.

4. The method as claimed in claim 1, wherein in cross-section of the tape, the tape has a convex shape.

5. The method as claimed in claim 4, wherein the convex shape is biconvex or plano-convex.

6. The method as claimed in claim 1, wherein in step b) in each layer of the plurality of layers, adjacent turns are arranged with an overlap.

7. The method as claimed in claim 1, wherein each turn is shifted axially at least with 20% of the width of the tape.

8. The method as claimed in claim 1, wherein in step c) the tape is heated under pressure higher than atmospheric pressure.

9. The method as claimed in claim 1, comprising prior to step b) providing an inner semiconducting layer around the conductor, wherein in step b) the winding of the tape is around the inner semiconducting layer.

10. The method as claimed in claim 1, wherein the insulation system layer is an insulation layer or an outer semiconducting layer.

11. The method as claimed in claim 1, wherein the tape comprises a polymeric material.

12. The method as claimed in claim 11, wherein the polymeric material includes one of polyethylene, polypropylene, ethylene propylene rubber, EPR, and ethylene propylene diene monomer rubber.

13. The method as claimed in claim 1, wherein the building of the insulation forms part of a cable-jointing operation or a repair operation of the insulation system of the power cable.

14. The method as claimed in claim 1, wherein the power cable is a high voltage power cable.

15. The method as claimed in claim 2, wherein the thickness decreases symmetrically towards the lateral edges.

16. The method as claimed in claim 2, wherein in cross-section of the tape, the tape has a convex shape.

17. The method as claimed in claim 2, wherein in step b) in each layer of the plurality of layers, adjacent turns are arranged with an overlap.

18. The method as claimed in claim 2, wherein in each layer of the plurality of layers, each turn of tape is arranged axially shifted along the axial direction of the conductor relative to all turns of the tape of any adjacent layer of tape.

* * * * *